United States Patent [19]

Pendalwar et al.

[11] Patent Number: 5,750,284
[45] Date of Patent: May 12, 1998

[54] ELECTROLYTE COMPOSITION FOR RECHARGEABLE ELECTROCHEMICAL CELLS

[75] Inventors: Shekhar L. Pendalwar, Lawrenceville; Manuel Oliver; Ganesh Venugopal, both of Duluth, all of Ga.

[73] Assignee: Motorola, Inc., Schaumburg, Ill.

[21] Appl. No.: 780,264

[22] Filed: Jan. 8, 1997

[51] Int. Cl.$^6$ .................................................. H01M 10/40
[52] U.S. Cl. .......................................................... 429/197
[58] Field of Search ..................................... 429/197, 194, 429/196

[56] References Cited

U.S. PATENT DOCUMENTS

| | | |
|---|---|---|
| 4,840,858 | 6/1989 | Furukawa et al. . |
| 4,983,476 | 1/1991 | Slane et al. ................... 429/197 |
| 5,085,952 | 2/1992 | North ...................... 429/197 X |
| 5,168,019 | 12/1992 | Sugeno . |
| 5,272,022 | 12/1993 | Takami et al. ................ 429/197 |
| 5,284,722 | 2/1994 | Sugeno et al. . |
| 5,292,601 | 3/1994 | Sugeno et al. . |
| 5,472,809 | 12/1995 | Perton et al. . |
| 5,474,862 | 12/1995 | Okuno et al. ................. 429/197 |
| 5,525,443 | 6/1996 | Okuno et al. ................. 429/194 |

OTHER PUBLICATIONS

Nakamura, et al, 1996, Suppression of electrochemical decomposition of PC at a graphite anode, Journal of Power Sources.

*Primary Examiner*—Anthony Skapars
*Attorney, Agent, or Firm*—Kenneth M. Massaroni; Kelly A. Gardner

[57] ABSTRACT

An electrochemical cell (10) includes first and second electrodes (12) and (14) with an electrolyte system (26) disposed therebetween. The electrolyte system includes a polymeric support structure through which is dispersed an electrolyte active species in an organic solvent. The solvent, which remains liquid to low temperatures, is a binary or higher order system comprising diethyl carbonate and one or more of propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof.

4 Claims, 1 Drawing Sheet

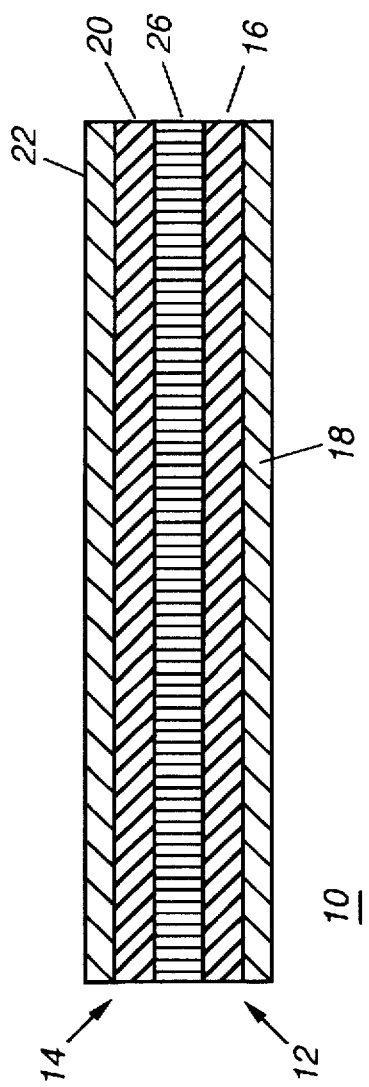

ELECTROLYTE COMPOSITION FOR RECHARGEABLE ELECTROCHEMICAL CELLS

TECHNICAL FIELD

This invention relates in general to the field of electrolytes for electrochemical cells, and more particularly to electrolytes for lithium, rechargeable electrochemical cells.

BACKGROUND OF THE INVENTION

There has been a great deal of interest in developing better and more efficient methods for storing energy for applications such as cellular communication, satellites, portable computers, and electric vehicles to name but a few. Accordingly, there has been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. Traditionally, a single solvent has been used, into which is incorporated the electrolyte salt which provides the ion transport between the opposing electrodes. More recently, researchers have begun to experiment with mixed solvent systems in an effort to enhance device performance. While these efforts have met with some success, one area in which performance has not been addressed is low temperature performance. As temperature drops below freezing (i.e., 0° C.), lithium battery device capacity rapidly drops from about 60% to virtually 0% by −20° C. This is a serious limitation to lithium battery performance as the applications devices into which the cells are incorporated—namely cellular phones, two-way radios, and laptop computers—are often in such low temperature environments. Accordingly, there exists a need for a new electrolyte system which combines the properties of high ionic conductivity and excellent low temperature performance. The electrolytes should not compromise performance at higher temperatures, should also be relatively cost effective, and easy to produce.

BRIEF DESCRIPTION OF THE DRAWINGS

FIG. 1 is a cross sectional side view of an electrochemical cell in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of an electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of a lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, co-pending U.S. patent application Ser. No. 08/464,440 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of materials known in the art, examples of which include aluminum, nickel, and combinations thereof. In one preferred embodiment, cathode substrate 22 is fabricated of aluminum.

Disposed between electrodes 12 and 14 is a layer of an electrolyte system 26. The electrolyte system 26 comprises an electrolyte active species dispersed in a polymer gel electrolyte support structure. The polymer gel support structure may consist of one or more different polymers.

The polymer from which the polymeric support structure is fabricated may be selected from the group consisting of polyethylene, polypropylene, polytetrafluroethylene, polyethyleneterephthalate, polystyrene, ethylene propylene diene monomer, nylon, polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. Alternatively, the polymeric support structure may be fabricated of a multilayered structure of the foregoing polymers, such as is disclosed in commonly assigned, co-pending patent application Ser. No. 08/739,229, filed Oct. 28 1996, in the names of Venugopal, et al, the disclosure of which is incorporated herein by reference.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$ and combinations thereof.

The organic solvent comprises at least diethyl carbonate, and one or more solvents selected from the group consisting of propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof. In a preferred embodiment, the organic solvent comprises at least 70% diethyl carbonate with the balance being one or more of the above-mentioned solvents.

One preferred solvent is one which is a binary system comprising diethyl carbonate and ethylene carbonate. In this embodiment, diethyl carbonate comprises at least about 70% of the solvent, and preferably about 90% of the organic solvent.

In a second preferred embodiment, said organic solvent is a ternary system comprising at least diethyl carbonate and ethylene carbonate, and one additional solvent selected from the group consisting of propylene carbonate, dimethyl carbonate, dipropylcarbonate, dimethylsulfoxide, acetonitrile, dimethoxyethane, tetrahydrofuran, n-methyl-2-pyrrolidone, and combinations thereof. Alternatively, the ternary system may comprise at least diethyl carbonate and propylene carbonate, and one additional solvent selected from the group consisting of ethylene carbonate, dimethyl carbonate, dipropylcarbonate, dimethylsulfoxide, acetonitrile, dimethoxyethane, tetrahydrofuran, n-methyl-2-pyrrolidone, and combinations thereof. In such a system, relative proportions are as follows: at least 60% diethyl carbonate (DEC), at least 10% ethylene carbonate (EC), and at least 10% propylene carbonate (PC).

The invention may be better understood from a perusal of the examples which follow.

EXAMPLES

Example I

To test this electrolyte, a flat cell, designated Test 1 was assembled with a modified electrolyte comprising a ratio of 90:10 DEC to EC, and 1 M LiPF6. The 90:10 ratio of DEC to EC composition was used to provide an adequate amount of EC to keep the medium reasonably polar for good ionic conductivity. The cell was cycled through 8 cycles before subjecting it to a low temperature study. The results are shown below in Table 1. For a comparison, the performance of a conventional cell with an electrolyte comprising a 60:40 ratio of DEC to EC, and 1M LiPF6 as the liquid electrolyte component is shown as a control cell.

As it is quite evident from Table 1, the performance of the test cell was far superior than that of the conventional cell. Especially notable was the significant improvement in the capacity at subzero temperatures. For example the control cell had almost no capacity at −20° C.: Conversely the one with the new electrolyte composition still had 40% capacity.

TABLE 1

Comparative Low Temp. Performance of Large Cells

| | Low Temp. Capacity/Total capacity (%) | |
|---|---|---|
| Temperature | Control | Test 1 |
| 10 | 90.4 | 93.9 |
| 5 | 73.7 | 91.8 |
| 0 | 60.0 | 90.3 |
| −5 | 31.4 | 81.2 |
| −10 | 9.8 | 81.0 |
| −15 | 3.6 | 67.3 |
| −20 | 0.5 | 39.4 |

Example II

A second electrolyte composition was prepared in order to investigate a ternary electrolyte solvent composition comprising DEC/EC/PC. The idea of using PC was thought to be beneficial for two reasons: First it would reduce the high concentration of DEC in the previous low temperature composition (90:10 DEC/EC); and second, PC has a low freezing point (−55° C.) compared to EC (−37° C.) hence the addition of PC as a third component to DEC/EC mixture was expected to yield a composition that would be at least the equivalent, in terms of low temperature performance, of the DEC/EC mixture alone.

The study was initiated by comparing Differential Scanning Calorimetry profiles (DSC's) of various compositions of the ternary electrolyte (DEC/EC/PC). Preliminary examination of the DSC data indicated that in general, compositions with higher DEC contents (70% or above) and with PC contents higher than that of EC, were preferred. As the EC content increased in these compositions, higher temperature transitions became significant. Unequal proportions of PC to EC (with PC>EC) was better in the same respect. With decreasing DEC content (60% or less) and EC and PC being in a 1:1 ratio, higher temperature transitions became prominent. Based on these observations it appeared that compositions with higher DEC content (70% or above) and with PC and EC in unequal ratio (PC >EC) would be good liquid electrolyte candidates for low temperature cell performance study. Based on this study two electrolyte compositions, DEC/EC/PC in a ratio of 75:10:15 and DEC/EC/PC in a ratio of 75:15:10 were selected for further investigations.

Before conducting low temperature evaluation, it was important to determine the cycle life performance of cells built with these new electrolyte compositions at ambient temperature. Hence, two lithium ion cells were built in a flat cell format to test cycle life. Based on the cycle life performance, one of the compositions, DEC/EC/PC (75:10:15), was selected for investigation of low temperature performance. This was due to the fact that it showed slightly better discharge capacity than the other cell.

The selected electrolyte composition (DEC/EC/PC (75:10:15)) was compared with the standard electrolyte composition (DEC/EC, 60:40) and the low temperature composition of Example I, DEC/EC (90:10). Thus, three lithium ion cells were built: (1) Cell F6J1070 [standard electrolyte, DE/EC (60:40)/1M LiPF6]; (2) Cell F6J1071 [new electrolyte composition, DEC/EC/PC (75:10:15)/1M LiPF6]; and (3) Cell F6J470 [DEC/EC (90:10)/1M LiPF6]. The comparative low temperature performance of these cells is shown in Table 2 below.

TABLE 2

LOW TEMPERATURE PERFORMANCE

| | Fractional Low Temp. Capacity of Cell | | |
|---|---|---|---|
| Temp. °C. | Cell F6J1070 (standard, 60:40, DEC/EC/1M LiPF6) | Cell F6J1071 (75:10:15, DEC/EC/PC/1M LiPF6) | Cell F6J470 (90:10, DEC/EC/1M LiPF6) |
| 20 | 98.8 | 96.0 | 96.4 |
| 10 | 95.9 | 93.3 | 94.5 |
| 5 | 97.1 | 94.2 | 95.9 |
| 0 | 95.4 | 91.3 | 94.2 |
| −5 | 89.6 | 88.1 | 92.9 |
| −10 | 80.3 | 82.5 | 90.0 |
| −15 | 45.1 | 78.8 | 83.6 |
| −20 | 19.6 | 55 | 56.3 |

As it is seen from the Table 2, the new ternary electrolyte composition DEC/EC/PC, shows a considerable improvement in low temperature performance over that of standard electrolyte composition at (−20° C. where the standard cell had only 19.6% capacity whereas the cell with the new ternary electrolyte composition still had about 55% capacity. The performance of this new ternary electrolyte also seems to be almost parallel to that of the previous best low temperature composition (DEC/EC, 90:10). However, it is believed that the new composition will likely perform better at higher temperatures than the composition of Example I.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

We claim:

1. An elertrolyte system for a rechargeable electrochemical cell having a carbon-containing anode and a lithiated transition metal cathode said electrolyte system comprising a polymeric support structure having an electrolyte active species dispersed therein, said electrolyte active species comprising an electrolyte salt dispersed in an organic solvent, wherein said organic solvent is a ternary system comprising at least 90% diethyl carbonate and the balance being propylene carbonate (PC), and one additional solvent selected from the group consisting of ethylene carbonate, dimethyl carbonate, dipropylcarbonate, dimethylsulfoxide, acetonitrile, dimethoxyethane, tetrahydrofuran, n-methyl-2-pyrrolidone, and combinations thereof, such that the amount of PC is always greater than the one additional solvent.

2. An electrolyte for an electrochemical cell said electolyte remaining substantially liquid to temperatures of −20°0 C., said electrolyte comprising electrolyte salt dispersed in an organic solvent, wherein said organic solvent is a ternary system comprising at least 70% diethyl carbonate, and the balance being at least 10% ethylene carbonate, and propylene carbonate such that the amount of propylene carbonate is greater than the amount of ethylene carbonate.

3. An electrochemical cell comprising:

an anode;

a cathode; and an electrolyte comprising an electrolyte salt dispersed in an organic solvent, wherein said organic solvent is a ternary system comprising at least 70% diethyl carbonate and the balance being propylene carbonate (PC), and one additional solvent selected from the group consisting of ethylene carbonate, dimethyl carbonate, dipropylcarbonate, dimethylsulfoxide, acetonitrile, dimethoxyethane, tetrahydrofuran, n-methyl-2-pyrrolidone, and combinations thereof, such that the amount of PC is always greater than said one additional solvent.

4. An electrochemical cell comprising:

an anode a cathode; and an electrolyte comprising an electrolyte salt dispersed in an organic solvent, wherein said organic solvent is a ternary system comprising at least 60% diethyl carbonate, and the balance being at least 10% ethylene carbonate and at least 10% propylene carbonate.

* * * * *